(12) United States Patent
Ball

(10) Patent No.: US 10,069,528 B2
(45) Date of Patent: Sep. 4, 2018

(54) ATTACHMENT DEVICE

(71) Applicant: Zachary W. Ball, Troy, MI (US)

(72) Inventor: Zachary W. Ball, Troy, MI (US)

( * ) Notice: Subject to any disclaimer, the term of this patent is extended or adjusted under 35 U.S.C. 154(b) by 136 days.

(21) Appl. No.: 15/093,291

(22) Filed: Apr. 7, 2016

(65) Prior Publication Data

US 2016/0301443 A1 Oct. 13, 2016

Related U.S. Application Data

(60) Provisional application No. 62/144,136, filed on Apr. 7, 2015.

(51) Int. Cl.
*H04B 1/3888* (2015.01)
*H04B 1/3877* (2015.01)
*C09J 7/22* (2018.01)

(52) U.S. Cl.
CPC .............. *H04B 1/3888* (2013.01); *C09J 7/22* (2018.01); *H04B 1/3877* (2013.01); *C09J 2201/122* (2013.01); *C09J 2201/606* (2013.01); *C09J 2423/106* (2013.01); *C09J 2433/00* (2013.01); *C09J 2467/006* (2013.01)

(58) Field of Classification Search
CPC ............ H04B 1/3888; F16B 1/00; F21V 9/00
See application file for complete search history.

(56) References Cited

U.S. PATENT DOCUMENTS

| | | | |
|---|---|---|---|
| 6,550,108 B2 | 4/2003 | Pratl | |
| 7,661,567 B2 | 2/2010 | Myers | |
| 8,236,129 B2 | 8/2012 | Xie et al. | |
| 8,523,031 B2 | 9/2013 | Hedrick | |
| 9,345,312 B1* | 5/2016 | Washio | A45F 5/02 |
| 2006/0113345 A1 | 6/2006 | Zoullas et al. | |
| 2009/0090750 A1 | 4/2009 | Alcenat | |
| 2011/0284599 A1 | 11/2011 | Sternick | |
| 2012/0080469 A1 | 4/2012 | Souders | |
| 2012/0091176 A1 | 4/2012 | Samuel | |
| 2012/0286118 A1 | 11/2012 | Richards | |

(Continued)

OTHER PUBLICATIONS

Device Lanyard obtained online at http://www.adaptivesolutions.com/pd-device-lanyard.cfm, article obtained on Dec. 1, 2014.

(Continued)

*Primary Examiner* — Myron K Wyche
(74) *Attorney, Agent, or Firm* — Oppenhuizen Law PLC; David L. Oppenhuizen

(57) ABSTRACT

A device for attaching an article of manufacture, such as a mobile phone, to a lanyard. The device includes a thin bendable sheet of material having an adhesive on at least one side. The sheet of material has an elongated portion having a first section and a second section, and the first section capable of being doubled-over and secured to the second section by the adhesive, so as to engage a clip from the lanyard. The sheet has a pair of opposed spirals extending away from each other and spiraling around toward the elongated portion. The spirals curve, or spiral, at least 180° from a beginning b of the spiral to an ending e of the spiral. The radius of curvature along the length of the spirals continuously decreases in a manner that approximates the shape of a Fibonacci spiral.

20 Claims, 2 Drawing Sheets

(56) References Cited

U.S. PATENT DOCUMENTS

2013/0182446 A1* 7/2013 Gourdie .................... F21V 9/00
362/351
2014/0042197 A1 2/2014 Skenderian

OTHER PUBLICATIONS

TEK TAB Adhesive Lanyard Mount obtained from http://www.examiner.com/review/tech-review-tek-tab-adhesive-lanyard-mount, article obtained on Dec. 1, 2014, article dated Apr. 11, 2012.
Universal Adhesive O-Ring obtained online at http://www.accessorygeeks.com/universal-adhesive-o-ring.html, obtained online on Dec. 1, 2014.

* cited by examiner

ATTACHMENT DEVICE

CROSS REFERENCE TO RELATED APPLICATION

This application claims the benefit of U.S. Provisional Application 62/144,136, which was filed on Apr. 7, 2015, the disclosure of which is hereby incorporated by reference.

BACKGROUND OF THE INVENTION

1. Field of the Invention

The present invention pertains to an attachment device for connecting an article of manufacture to a lanyard or similar device. More particularly, the present invention pertains to an attachment device for temporarily connecting a mobile phone to a lanyard or similar device.

2. Description of the Prior Art

Devices exist in the prior art for connecting a mobile phone to a lanyard, such as disclosed in U.S. Pat. No. 6,550,108 to Pratl; U.S. Pat. No. 7,661,507 to Myers; and U.S. Pat. No. 8,523,031 to Hedrick. However, each of these devices is intended to be permanently attached to the mobile phone.

It is believed that there are applications in which a phone is preferably attached to a device like a lanyard, neckband, or wristband only for a temporary amount of time. For example, someone may find it useful to have their phone connected to a lanyard while they are at the beach or an amusement park, but they do not wish to have the lanyard permanently attached to their phone for everyday use. Thus, there is believed to be an unmet need for temporarily connecting one's phone to a lanyard.

Furthermore, as phones continue to grow in size and the variety of mobile applications continues to grow, it is believed that mobile phones could be utilized as an interactive display device in particular situations, such as at trade shows or networking events. In these instances, it would be desirable to wear one's mobile phone around the user's neck so that the display is visible to others.

Thus, there remains a need for a device for temporarily attaching a lanyard to a mobile phone which is easy to use and easy to remove from the mobile phone when desired, but which stays securely attached to the mobile phone during use.

The present invention, as is detailed hereinbelow, seeks to improve upon the prior art by providing an attachment device for securing a mobile phone to a lanyard.

SUMMARY OF THE INVENTION

The present invention provides an attachment device comprising:
(a) a thin bendable sheet of material having an adhesive on at least one side, the sheet of material having an elongated portion having a first section and a second section, and the first section capable of being doubled-over and secured to the second section by the adhesive; and
(b) the sheet having a pair of opposed spirals extending away from each other and spiraling around toward the elongated portion, the spirals spiraling at least 180°.

Optionally, the sheet of material is formed from an inelastic material, such as a polypropylene or a polyester. Preferably the sheet of material is formed from a material having a tensile strength of at least 12 pounds per inch.

Optionally, the adhesive is a pressure-sensitive adhesive such as an acrylic adhesive.

Optionally, the spirals mirror each other, and also the spirals optionally spiral at least 360°, or even 630° or more.

Optionally the elongated portion includes at least one wing, or tab, extending laterally off the side of the elongated portion. The wing can be folded over the elongated portion once the first section of the elongated portion is doubled-over the second section to help mechanically secure the first and second sections together.

Optionally, the sheet of material includes a portion that is free of adhesive to help remove the attachment device from the article. Preferably the portion that is free of adhesive is located along an outer edge and opposite the side of the sheet of material from the elongated portion.

For a more complete understanding of the present invention, reference is made to the following detailed description and accompanying drawings. In the drawings, like reference characters refer to like parts throughout the views in which:

DETAILED DESCRIPTION OF THE PREFERRED EMBODIMENT

Figure 1:
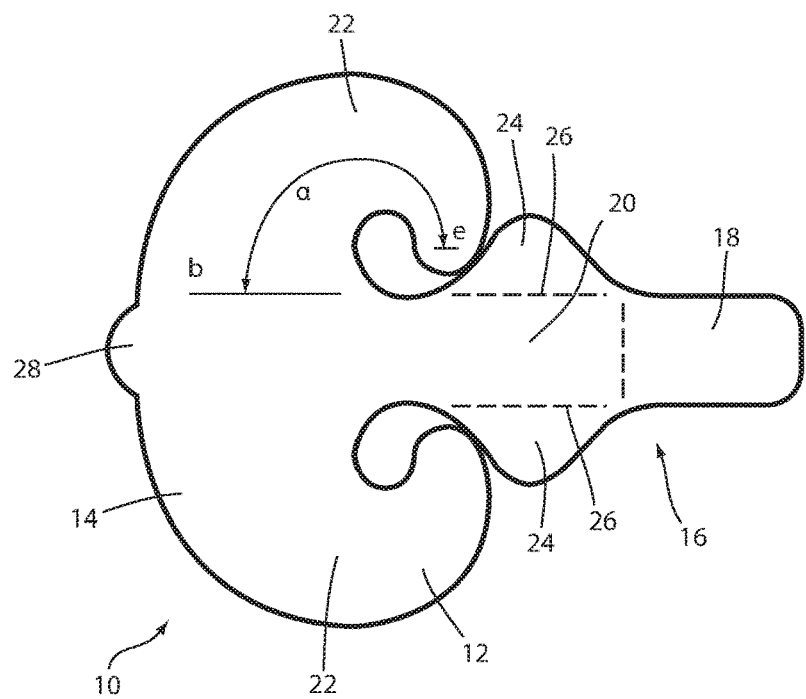
FIG. 1 is a top view of a first embodiment of the present invention hereof.
Figure 2:
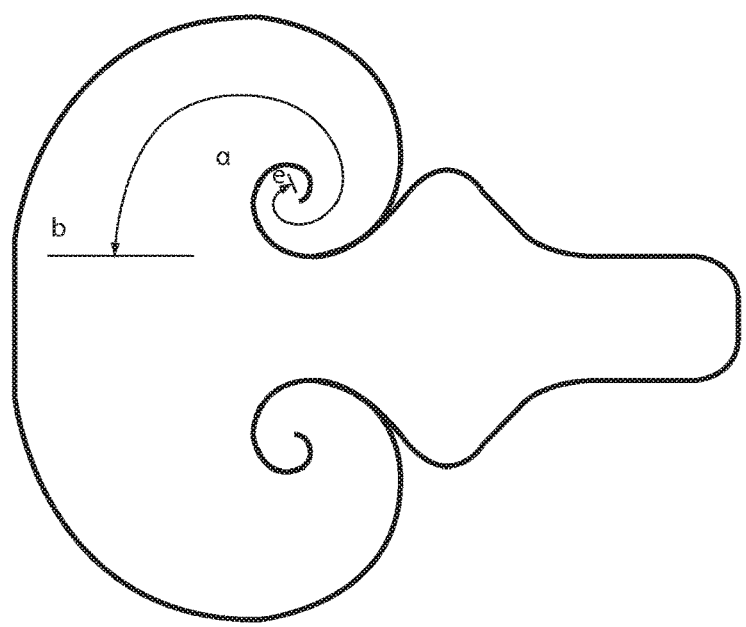
FIG. 2 is a top view of a second embodiment of the present invention.

In accordance with the present invention, and as shown generally in FIGS. 1 and 2, there is provided an attachment device 10 comprising: (a) a thin bendable sheet of material 12 having an adhesive 14 on at least one side, the sheet of material 12 having an elongated portion 16 having a first section 18 and a second section 20, and the first section 18 capable of being doubled-over and secured onto the second section 20 by the adhesive 14; and (b) the sheet 12 having a pair of opposed spirals 22 that initially extend away from each other and spiral around toward the elongated portion 16, the spirals 22 spiraling at least 180°.

As mentioned above, the sheet of material 12 is thin and bendable, and is preferably formed from an inelastic material, such as a polypropylene or a polyester. Preferably the sheet of material 12 is formed from a material having a tensile strength of at least 12 pounds per inch and having desirable sheer strength properties so that the attachment device 10 does not rip during use.

Figure 3:
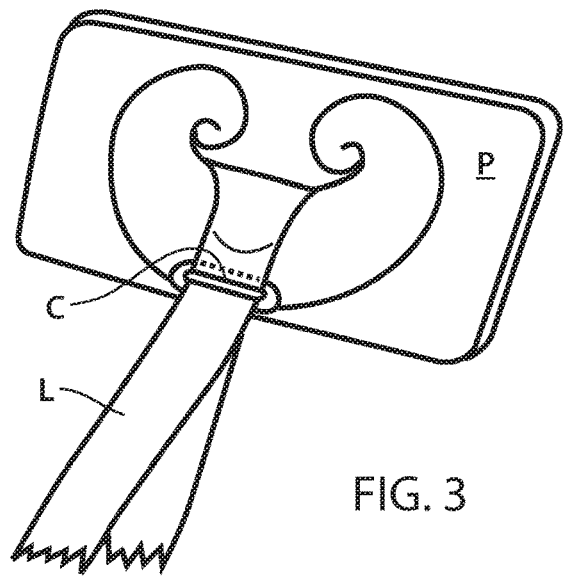
FIG. 3 is a perspective view of the attachment device secured to an article of manufacture.
Figure 4:
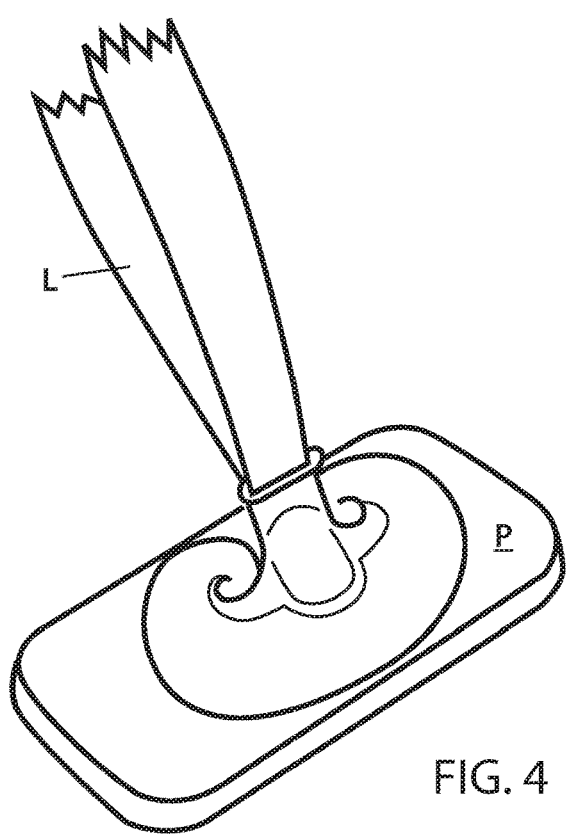
FIG. 4 is a second perspective view of the attachment device secured to an article of manufacture.

As shown in FIGS. 3 and 4, the attachment device 10 includes an elongated portion 16 which can be attached to the lanyard L or other similar device. The elongated portion 16 has the first section 18 and the second section 20. A clip C or string or other similar device on the lanyard L can be laid across the elongated portion 16, and the first section 18 is then doubled-over and secured to the second section 20 by the adhesive 14, thereby entrapping the clip C or string between the first and second sections 18, 20.

As shown in FIGS. 1 and 2, the elongated portion 16 can optionally include at least one wing 24, or tab, which extends laterally off the side of the elongated portion 16. Preferably two opposed wings 24 are provided to help mechanically secure the first and second sections 18, 20 together. The wings 24 are positioned to extend off either the first section 18 or second section 20. In use, the first section 18 is folded over the string or clip C of the lanyard L and secured to the second section 20. The wings 24 are then folded over and around the side edges 26 of the first and second sections 18, 20 to provide additional strength to keep the first section 18 adhered to the second section 20.

The sheet of material 12 has a pair of opposed spirals 22 that initially extend away from each other and in a direction perpendicular to the direction of the elongated portion 16. As shown in FIGS. 3 and 4, the spirals 22 function to resist external forces applied to the elongated portion 16 and to keep the attachment device 10 from being pulled off of the mobile phone P. The opposed spirals 22 spiral around back toward the elongated portion 16 in a manner in which the radius of curvature continues to decrease along the length of the curve, thereby providing a spiral shape. Preferably, each of the opposed spirals 22 approximates the form of a Fibonacci spiral and the spirals 22 mirror each other.

As shown in FIG. 1, the amount of spiral curvature is defined by the angle α, which is the degree of rotation from the beginning b of the spiral to the end e of the spiral 22. Stated differently, α is defined as the degree of rotation between the lines which are perpendicular to the beginning and end of the spiral 22. As shown in FIG. 1, α is at least 180°. Even more preferably, and as shown in the embodiment in FIG. 2, α is at least 360°, or even 630° or more.

Optionally, the sheet of material 12 includes a portion 28 that is free of adhesive 14 to help remove the attachment device 10 from the mobile phone P. Preferably the portion 28 that is free of adhesive 14 is located along an outer edge and opposite the side of the sheet of material 12 from the elongated portion 16.

The adhesive 14 is preferably a pressure-sensitive adhesive 14, such as an acrylic adhesive 14, although any suitable type of adhesive 14 can be used. The adhesive 14 should have a relatively high peel adhesion strength and not leave any residue once the attachment device 10 has been removed from the mobile phone P.

According to the invention described above, an attachment device is provided for temporarily attaching a lanyard to a mobile phone which is easy to use and easy to remove from the mobile phone when desired, but which stays securely attached to the mobile phone during use.

What is claimed is:

1. An attachment device comprising:
   (a) a thin bendable sheet of material having an adhesive on at least one side, the sheet of material having an elongated portion having a first section and a second section, and the first section capable of being doubled-over and secured to the second section by the adhesive; and
   (b) the sheet having a pair of opposed spirals extending away from each other and spiraling around toward the elongated portion, the spirals spiraling at least 180° from a beginning b of the spiral to an ending e of the spiral.

2. The attachment device of claim 1 in which the sheet of material is formed from an inelastic material.

3. The attachment device of claim 2 in which the adhesive is a pressure-sensitive adhesive.

4. The attachment device of claim 2 in which the spirals mirror one another.

5. The attachment device of claim 4 in which the spirals spiral at least 360° from a beginning b of the spiral to an ending e of the spiral.

6. The attachment device of claim 1 in which the adhesive is a pressure-sensitive adhesive.

7. The attachment device of claim 1 in which the spirals spiral at least 360° from a beginning b of the spiral to an ending e of the spiral.

8. The attachment device of claim 7 in which the sheet of material is formed from an inelastic material.

9. The attachment device of claim 7 in which the spirals spiral at least 630° from a beginning b of the spiral to an ending e of the spiral.

10. The attachment device of claim 1 in which the radius of curvature of the spiral continuously decreases along the length thereof.

11. The attachment device of claim 10 in which the sheet of material is formed from an inelastic material.

12. The attachment device of claim 10 in which the spirals mirror one another.

13. The attachment device of claim 12 in which the spirals spiral at least 360° from a beginning b of the spiral to an ending e of the spiral.

14. The attachment device of claim 13 in which the spirals spiral at least 630° from a beginning b of the spiral to an ending e of the spiral.

15. The attachment device of claim 10 in which the adhesive is a pressure-sensitive adhesive.

16. The attachment device of claim 10 in which the spirals spiral at least 360° from a beginning b of the spiral to an ending e of the spiral.

17. The attachment device of claim 16 in which the spirals spiral at least 630° from a beginning b of the spiral to an ending e of the spiral.

18. The attachment device of claim 1 in which the spirals mirror one another.

19. The attachment device of claim 1 in which the elongated portion has at least one wing extending laterally off a side of the elongated portion.

20. The attachment device of claim 1 in which the sheet of material includes a portion that is free of adhesive, and the portion free of adhesive is located along an outer edge of the sheet of material and opposite a side of the sheet of material from the elongated portion.

* * * * *